United States Patent [19]
Jackson

[11] 3,784,459
[45] Jan. 8, 1974

[54] DEVICE FOR DETERMINING THE ACTIVITY OF OXYGEN IN MOLTEN METAL

[75] Inventor: Paul L. Jackson, Dearborn, Mich.

[73] Assignee: Ford Motor Company, Dearborn, Mich.

[22] Filed: June 12, 1972

[21] Appl. No.: 261,896

[52] U.S. Cl. .............................. 204/195 S
[51] Int. Cl. .............................. G01n 27/46
[58] Field of Search ................. 204/17, 195 S, 286, 204/297 R; 339/177 R, 177 E, 258 R, 258 A, 339/258 C, 258 F, 258 P, 258 RR, 258 S, 339/258 T, 258 TC

[56] References Cited
UNITED STATES PATENTS

| | | | |
|---|---|---|---|
| 3,619,381 | 11/1971 | Fitterer | 204/195 S |
| 3,657,094 | 4/1972 | Hans et al. | 204/195 S |
| 3,468,780 | 9/1969 | Fischer | 204/195 S |
| 3,476,672 | 11/1969 | Snyder et al. | 204/195 G |
| 3,253,250 | 5/1966 | Harrison et al. | 339/258 R |
| 3,630,874 | 12/1971 | Olette et al. | 204/195 S |

Primary Examiner—T. Tung
Attorney—William E. Johnson, and Keith L. Zerschling

[57] ABSTRACT

A device for determining the activity of oxygen in molten metal is disclosed. The device has a reusable portion which is used during each oxygen determination. The device also has an expendable portion which is consumed in the molten metal during each oxygen determination. A feature of the device is that no fine wires are utilized in connecting the expendable portion to the reusable portion. In the expendable portion of the device, a half cell comprising a solid electrolyte and an oxygen reference material is protected from thermal and mechanical shock upon its immersion into the molten metal. Another feature of the device is that the expendable portion can be easily attached to the reusable portion.

9 Claims, 3 Drawing Figures

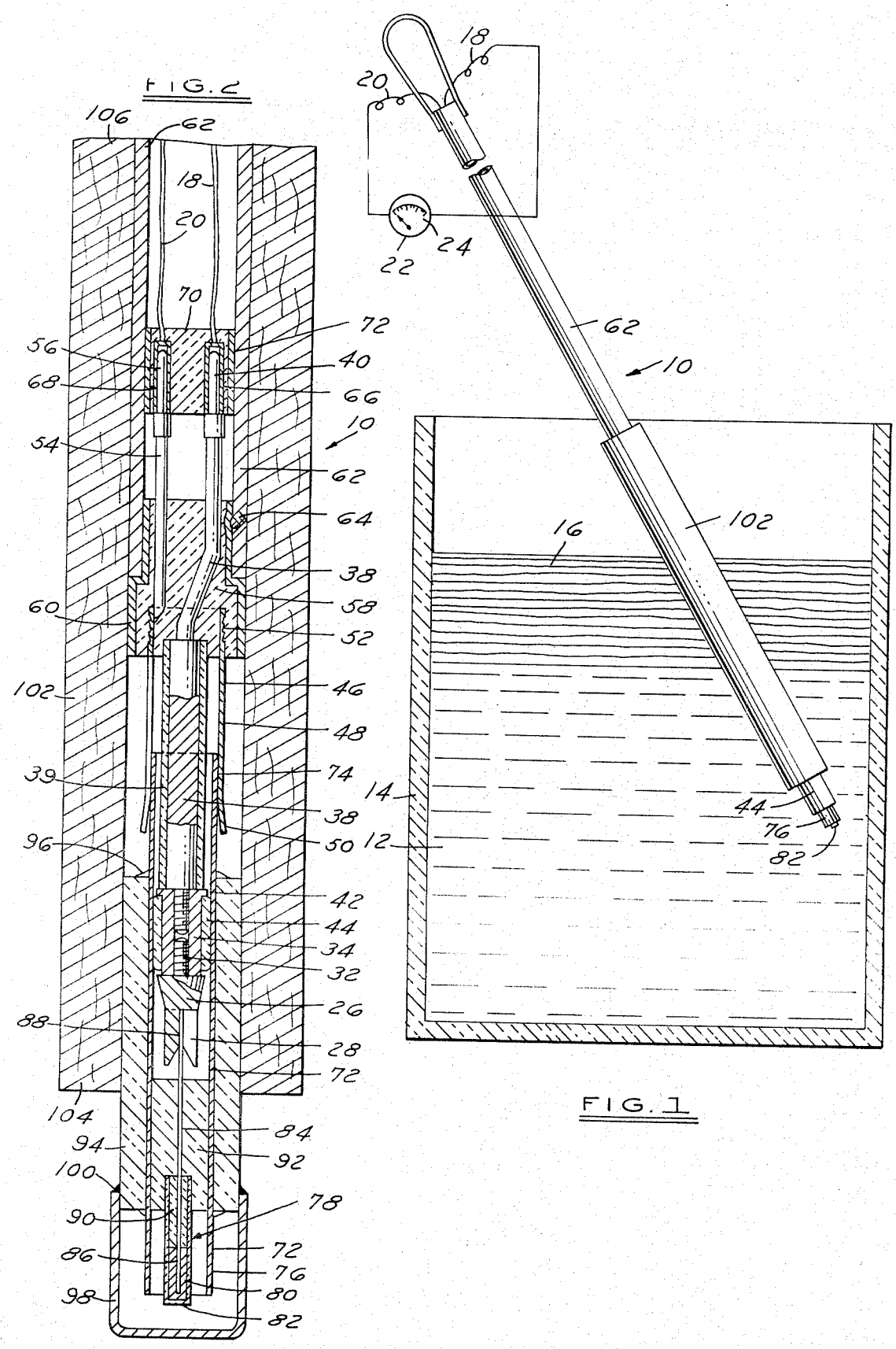

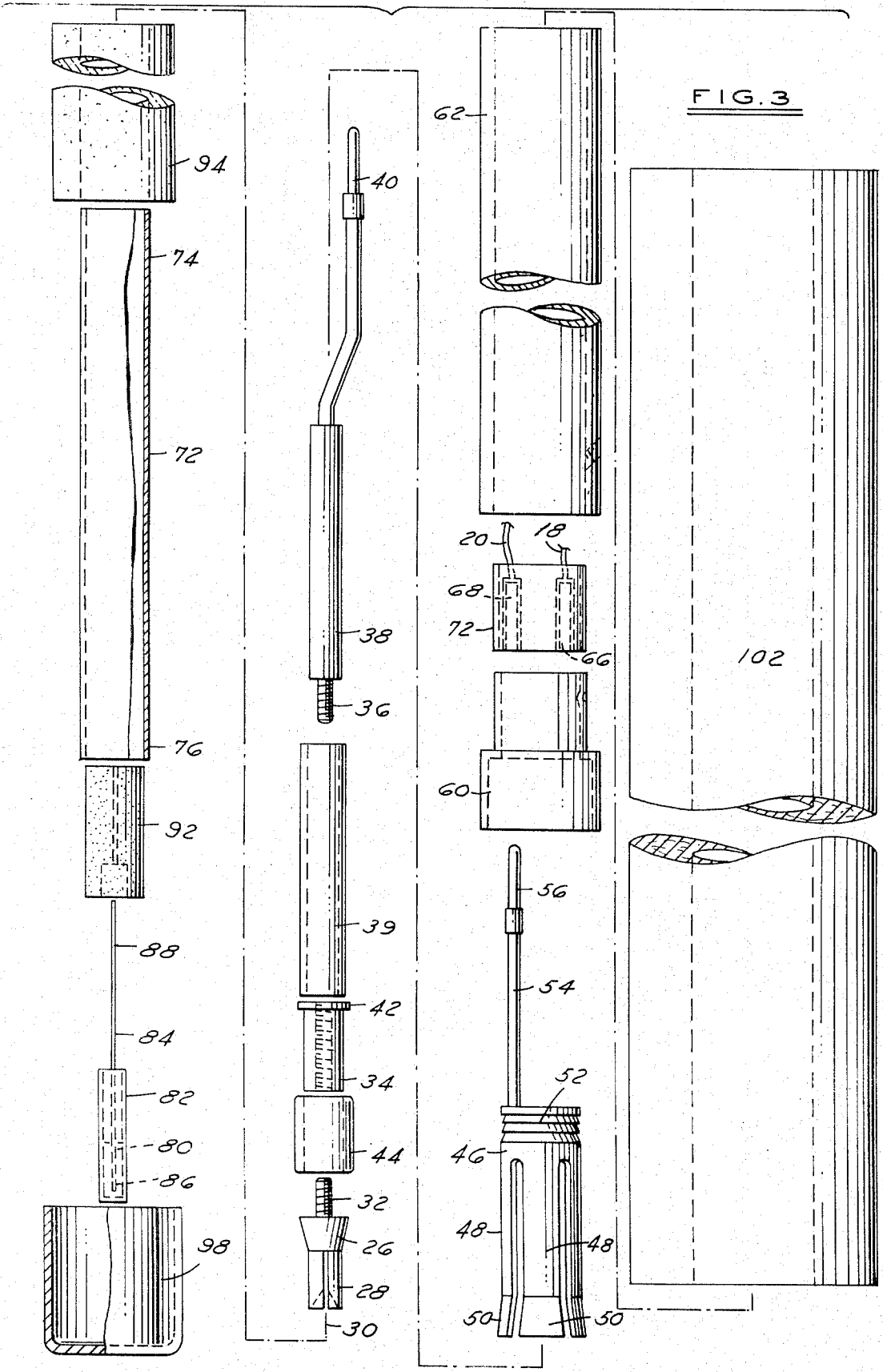

DEVICE FOR DETERMINING THE ACTIVITY OF OXYGEN IN MOLTEN METAL

BACKGROUND OF THE INVENTION

This invention relates to a device for electrochemically measuring oxygen activity in molten metal. The device is of particular use in a case where the metal is steel and the oxygen concentration determination will allow the person controlling the steel making process to make steel with a desired oxygen content. Electrochemical measurements of oxygen in molten metal are accomplished by introducing two electrodes into the bath and measuring the potential difference therebetween. One of the two electrodes used for this measurement is a half cell containing, in its interior, a material which produces a known partial pressure or activity of oxygen.

U.S. Pat. Nos. 3,630,874 and 3,657,094 teach structures for determining the activity of oxygen in molten metals. The structure of this invention constitutes an improvement over the prior structures in that no fine wire connections are made to connect a reusable portion of the oxygen activity determining device with an expendable portion of the device. The device of this invention also provides positive protection for the half cell electrode during its initial immersion in the molten metal. The expendable portion of the device, which is easily assembled with the reusable portion of the device, is fabricated from relatively inexpensive materials and, thus, an oxygen determination can be made at a low cost.

SUMMARY OF THE INVENTION

This invention relates to a device for determining the activity of oxygen in molten metal and, more particularly, to a device for determining the activity of oxygen in molten metal, which device has a reusable portion, and an expendable portion consumed during each oxygen determination.

In accordance with the general teachings of this invention, the reusable portion of the device includes the following general structure. A first spring collet is constructed for gripping an electrode therein. First electrical connection leads connect the first spring collet to an electrical current measuring device. A second spring collet, having a central axis coaxial with a central axis of the first spring collet, is constructed for gripping an outer surface of a hollow electrode. Second electrical connection leads connect the second spring collet to the electrical current measuring device. A mounting structure positions portions of the first and the second electrical connection leads and the second spring collet with respect to one another about the central axis of the collets. The mounting structure also insulates these elements from one another. A rigid member grips the mounting structure to support all the elements held by the mounting structure.

The expendable portion of the device includes the following general structure. A hollow electrode has one end which is gripped in the second spring collet. The hollow electrode also has a free end which enters the molten metal. A half cell, forming an oxygen reference for immersion in the molten metal, is enclosed by an oxygen ion transparent, solid electrolyte. An electrode has a portion received within the half cell and another portion extending beyond the half cell to be gripped in the first spring collet. Insulating, mounting structure mounts the half cell within the free end of the hollow electrode so that the hollow electrode surrounds and protects the half cell. A surrounding insulator extends along a substantial portion of the length of the hollow electrode. A cap, which encircles the insulator near the free end of the hollow electrode, encloses the free ends of both the hollow electrode and the half cell. An outer protective tube encircles the reusable portion of the device on one end thereof and extends along the length of the device to encircle the insulator at the other end thereof.

It may be seen that the structure described above is one which provides a simple, but solid and effective direct connection between an electrode and a hollow electrode on one hand and first and second spring collets on the other hand. Such a connection retains the expendable portion of the device within the reusable portion of the device. Also, it should be noted that the free end of the hollow electrode protects the half cell from both thermal and mechanical shock during its initial exposure to the molten metal when the cap protecting the device is melted off in the molten metal.

BRIEF DESCRIPTION OF THE DRAWINGS

FIG. 1 is a schematic drawing showing the device of this invention in use to ascertain the oxygen activity of a steel bath.

FIG. 2 is a front elevation view, in cross section, of the device of FIG. 1 showing, in greater detail, the essential elements thereof.

FIG. 3 shows all of the elements of the device in a disassembled condition thereby to reveal the details thereof.

DESCRIPTION OF THE PREFERRED EMBODIMENT

In the drawings, a device for determining the activity of oxygen, generally identified by the numeral 10, is shown as being immersed in a bath of steel 12. The steel is contained in a confining structure 14 of known construction and has a layer of slag 16 floating thereon. A pair of insulated leads 18 and 20 are shown in FIG. 1 which extend from the end of the device and are connected to opposite poles of a current measuring device 22. The device 22 has a meter or recording potentiometer 24 thereon which gives an indication of the EMF generated when a standard of known oxygen activity is coupled with the dissolved oxygen in the steel by means of a solid electrolyte. This EMF is used to indicate the amount of oxygen in the steel so that the operator of the steel manufacturing process can make whatever corrections are needed in order to bring the oxygen level of the steel to a desired level.

The device 10 for determining the oxygen activity is best understood by reference to FIGS. 2 and 3. A reusable portion of the device will be initially described and then an expendable portion of the device will be described. With respect to the reusable portion, a first spring collet 26, formed of a suitable metal, has four opposed spring fingers 28 with inwardly facing gripping surfaces which can grip an electrode wire therein along a central axis 30 (FIG. 3). A threaded portion 32 of the first collet is threaded into an adapter 34, which adapter also receives therein a threaded portion 36 of a first electrical lead 38. This first electrical lead, protected by an insulator sleeve 39, is formed so as to be a rigid structure and it has a terminal end 40. The adapter 34 has a flared end 42 which positions an insulator ring 44 of ceramic material above the upper surface of the first collet.

A second spring collet 46, formed of a suitable metal, has four spring fingers formed at one end thereof, which fingers have flared portions 50 at the extreme ends thereof. The fingers having gripping surfaces which face inwardly toward the central axis but are spaced from the central axis a greater radial distance than the spring fingers 28 of the first spring collet 26. The second spring collet has a serrated upper portion 52. A second electrical lead 54, formed of a rigid material, is electrically connected at its lower end to the second collet and is provided with a terminal end 56 at the other end thereof.

As seen best in FIG. 2, a solidified refractory ceramic material 58, such as formed by castable alumina or zirconic, is used to mount portions of the first electrical lead 38 and the second electrical lead 54 as well as the serrated portion 52 of the second spring collet 46 within an encircling mounting element 60. By utilizing the refractory ceramic material 58 in such a manner, the various leads are mounted so that the first and the second spring collets are positioned about the central axis with respect to one another and the electrical leads are insulated from one another. A rigid member 62, in the form of a steel tube, grips the mounting element 60 and is secured thereto by set screws 64 (as shown in FIG. 2). In this preferred example, the rigid member 62 is a three-quarter inch pipe.

The rigid member 62 contains a pair of terminals 66 and 68 which respectively receive the terminal end 40 of the first lead 38 and the terminal end 56 of the second lead 54. In turn, the terminals 66 and 68 are respectively connected to the insulated leads 18 and 20. The terminals are also insulated from one another by a suitable refractory insulating material 70 which is contained within a support ring 72 of fixed radius which has a slip fit in the inner diameter of the rigid member 62. As previously discussed, the insulated leads 18 and 20 are attached to the current measuring device 22.

The structure discussed above is the reusable portion of the device 10 for determining the activity of oxygen in molten metal. It should be noted that the two spring collets 28 and 46 used to make electrical connections to the expendable portion of the device are of substantial construction and are not fine wire type devices. Also, because the two collets are coaxial about a central axis, the expendable portion of the device may be easily inserted therein and gripped thereby.

Having described the reusable portion of the device 10, attention is now directed to the expendable portion of the device. A tubular electrode 72 is provided for making electrical contact with the molten metal 12. Since the molten metal bath in the preferred example is steel, the tubular electrode is likewise formed of steel. An upper portion 74 of the tubular electrode 72 is gripped by the spring fingers 48 of the second spring collet 46 so that electrical connection may be made from a lower portion 76 of the electrode which actually is exposed to the molten metal 12.

A half cell, generally identified by the numeral 78, provides an activity reference for oxygen. Many systems have been proposed for the half cell and some of the suitable reference materials are metals and their oxides such as chromium: chromium oxide, titanium: titanium oxide, etc. These materials provide a source of constant oxygen activity and, therefore, act as an oxygen reference to be compared to the oxygen activity in the molten metal in order to ascertain the oxygen content of the metal bath. In this case, the half cell reference material 80 is chosen as chromium: chromium oxide. The half cell material is enclosed in an oxygen ion transparent solid electrolyte 82 such as a beryllia-zirconia electrolyte.

A molybdenum wire 84, having a diameter of about 0.04 inches, has a lower end 86 immersed in the half cell reference material 80 and an upper end 88 received between the spring fingers 28 of the first collet 26 thereby to provide a direct electrical path from the current measuring device 22 to the half cell material. The molybdenum wire and half cell reference material are sealed with the solid electrolyte structure by means of a suitable ceramic plug material 90 (FIG. 2).

An insulator structure 92, formed of a suitable refractory material, mounts the half cell 78 within the interior of the lower portion 76 of the tubular electrode 72. The half cell is also insulated from the tubular electrode by the ceramic material. As is evident from FIG. 2 of the drawings, the lower portion 76 of the tubular electrode 72 is constructed to extend beyond the mounted portion of and encircle the half cell 78. The intent of the design is that when the half cell is first exposed to the molten metal, it will be protected from both thermal and mechanical shock by the encircling lower portion of the hollow electrode.

A ceramic insulator sleeve 94 encircles and extends along a substantial portion of the length of the tubular electrode 72 as is best shown in FIG. 2. The sleeve is secured to the electrode by means of a hardened ceramic paste 96.

At the bottom end of the ceramic insulating sleeve 94, a cap 98 is bonded thereto either mechanically as in a press fit or by means of a hardened ceramic paste 100. The outer protective cap 98 encloses and protects the lower end 76 of the tubular electrode 72 and the half cell 78 during the period of time in which the lower portion of the device 10 is inserted through the slag 16 above the molten bath 12. Generally the cap is constructed of the same material as the metal bath to be tested so that upon entry into the metal bath, the cap will dissolve to expose the electrode and the half cell to the bath.

An outer protective tube 102 encircles, at a lower end 104, the ceramic insulator sleeve 94. An upper end 106 of the tube encircles and extends along a portion of the length of the rigid member 62. The tube 102 is constructed of cardboard and, generally, has a wall thickness of about three-eighths of an inch. It has been found that such a cardboard tube, when inserted in the steel bath, will have a life expectancy of about 20–30 seconds. A reading of the activity of the oxygen in a molten steel bath may be obtained in a time period of about 5 to 15 seconds. Therefore, the tube, which begins decomposition upon entry into the molten metal bath, will last long enough to protect the reusable portion of the device from damage by the molten steel.

There has been disclosed herein a device for determining the activity of oxygen in a molten metal bath and, more particularly, there has been disclosed such a device which has a reusable portion and an expendable portion. The device disclosed is one in which the expendable portion may be easily connected to the reusable portion. The connection between the two portions of the device is made without the use of fine wires and the expendable portion of the device is gripped firmly and held by the reusable portion of the device. Also, the device of this invention is one wherein the half cell used for supplying a reference oxygen activity is protected from mechanical and thermal shock by means of an encircling electrode. In view of this specification, many modifications of the invention will be obvious to those skilled in the art. It is intended that all such modifications which fall within the true spirit and scope of this invention be included within the appended claims.

What I claim is:

1. A device for determining the activity of oxygen in a molten metal, which device has a reusable portion (A) and an expendable portion (B) which is consumed during each oxygen determination,
   A. said reusable portion of said device comprising:
      a first spring collet means for gripping an electrode wire therein,
      first electrical connection means for connecting said first spring collet means to an electrical potential measuring device;
      a second spring collet means having a central axis coaxial with a central axis of said first spring collet means, said second spring collet means for gripping an outer surface of a hollow electrode;
      second electrical connection means for connecting said second spring collet means to the electrical potential measuring device;
      a mounting structure means for (a) positioning portions of said first and said second electrical connection means and said second spring collet means with respect to one another about said central axis and for (b) insulating such elements from one another; and
      a rigid member gripping said mounting structure means thereby supporting all elements held by said mounting structure means;
   B. said expendable portion of said device comprising:
      a hollow electrode having an end gripped in said second spring collet means and a free end for immersion in the molten metal;
      a half cell means for forming an oxygen reference for immersion in the molten metal, said half cell means including an oxygen ion transparent outer structure;
      an electrode wire having a portion received within said half cell means and another portion thereof gripped in said first spring collet means;
      insulating, mounting means for mounting said half cell means within said hollow electrode so that said free end of said hollow electrode substantially surrounds and protects a free end of said half cell means;
      an insulator means for extending along a substantial portion of the length of said hollow electrode and for surrounding the same;
      a cap means for encircling said insulator means near said free end of said hollow electrode, said cap means also for enclosing said free ends of both said hollow electrode and said half cell means; and
      an outer, expendable protective, tube means for encircling said reusable portion of said device on one end thereof and for extending along the length of the device to encircle said insulator means of said expendable portion of the device at the other end thereof.

2. The device for determining the activity of oxygen as defined in claim 1 wherein:
   said first electrical connection means includes: a first lead connected to said first spring collet means, an insulator electrically insulating said first lead, a first terminal formed on the end of said first lead, and a first insulated lead connected at one end to said first terminal and at the other end to the electrical current measuring device; and wherein:
   said second electrical connection means includes: a second lead connected to said second spring collet means, a second insulator electrically insulating said first lead from said second lead, a second terminal formed on the end of said second lead, and a second insulated lead connected at one end to said second terminal and at the other end to the electrical current measuring device.

3. The device for determining the activity of oxygen as defined in claim 2 wherein:
   said mounting structure means is formed by: (a) said first lead and second lead being formed so as to be structurally rigid, (b) said first and second leads being insulated from one another by said second insulator which is formed from a rigid, ceramic material; and (c) said second insulator being held by an encircling metal member; whereby said rigid member may grip said encircling metal member to support said elements held by said second insulator.

4. The device for determining the activity of oxygen in molten metal as defined in claim 1 wherein:
   both said insulating, mounting means and said insulator means of said expendable portion of said device are formed of a ceramic material; and wherein said cap is formed of a metal; and wherein said outer protective tube means is formed of cardboard.

5. A device for determining the activity of oxygen in a molten metal, which device has a reusable portion (A) and an expendable portion (B) which is consumed during each oxygen determination,
   A. said reusable portion of said device comprising:
      a first spring collet means encircling a central axis, said first spring collet means for gripping the outside diameter of an electrode wire therein,
      first lead means for connecting said first spring collet means to a terminal, said first lead means including a rigid structure portion connected to said first spring collet means;
      first insulator means for electrically insulating said first lead means;
      a second spring collet means having a central axis coaxial with said central axis of said first spring collet means, said second spring collet means for gripping an outer, circumferential surface of a tubular electrode member;
      second lead means for connecting said second spring collet means to a terminal, said second lead means including a rigid structure portion connected directly to said second spring collet means,
      second insulator means for electrically insulating said rigid portion of said second lead means and said rigid portion of said first lead means from one another;

a pair of terminals connected respectively to said first lead means and said second lead means;

a pair of insulated lead means one each respectively connected to one of said pair of terminals for connecting said terminals to an electrical potential measuring device;

a confining means for containing said second insulator means, said second insulator means when so contained also for positioning said rigid portions of said first and said second lead means with respect to one another thereby positioning said first spring collet means and said second spring collet means with respect to one another about said central axis; and a rigid tube member gripping said confining means to support all elements positioned by said second insulator means;

B. said expendable portion of said device comprising:

a tubular electrode member having an end gripped in said second spring collet means and a free end for providing a contact for immersion in the molten metal;

a half cell means for forming an oxygen reference for immersion in the molten metal, said half cell means including an oxygen ion transparent structure, an electrode wire having one end received within said half cell means and the other end thereof gripped in said first spring collet means;

insulating mounting means for mounting said half cell means within said tubular electrode so that said free end of said tubular electrode substantially surrounds and protects a free end of said half cell means;

an insulator extending along a substantial portion of the length of said tubular electrode member and in surrounding relationship thereto;

a cap means for encircling said insulator near said free end of said tubular electrode and for enclosing said free ends of both said tubular electrode and said half cell means; and an outer, expendable protective, tube means for encircling said reusable portion of said device on one end thereof and for extending along the length of the device to encircle said insulator of said expendable portion of the device at the other end thereof.

6. The device for determining the activity of oxygen as defined in claim 5 wherein:

said first spring collet means includes four spring fingers having gripping surfaces facing inwardly toward and positioned closely adjacent to said central axis; wherein said second spring collet means includes four spring fingers having flared free ends, said fingers of said second spring collet means facing inwardly toward said central axis but being spaced outwardly from said central axis a larger radial distance than said spring fingers of said first collet means.

7. The device for determining the activity of oxygen as defined in claim 5 wherein:

said second insulator means of said reusable portion of said device is a rigid ceramic material; and wherein said confining means for containing said second insulator means is an encircling metal member having a fixed radius about said central axis; whereby said rigid tube member may grip said encircling metal member to support all elements positioned by said second insulator means.

8. The device for determining the activity of oxygen as defined in claim 5 wherein:

said half cell means contains a metal and its oxide both in finely powdered form as an oxygen reference material.

9. The device for determining the activity of oxygen as defined in claim 5 wherein:

said insulating mounting means and said insulator of said expendable portion of said device are formed of a ceramic material; wherein said cap means is formed of a metal; and wherein said tube means is formed of cardboard.

* * * * *